(12) United States Patent
Su

(10) Patent No.: US 10,233,985 B2
(45) Date of Patent: Mar. 19, 2019

(54) HAND BRAKE SYSTEM USED ON PUMPING UNIT WITHOUT WALKING BEAM

(71) Applicant: Zhishen Su, Heilongjiang (CN)

(72) Inventor: Zhishen Su, Heilongjiang (CN)

(73) Assignee: Daqing Dannuo Petroleum Technology Development Co., Ltd., Daqing, Heilongjiang (CN)

( * ) Notice: Subject to any disclaimer, the term of this patent is extended or adjusted under 35 U.S.C. 154(b) by 0 days.

(21) Appl. No.: 15/657,230

(22) Filed: Jul. 24, 2017

(65) Prior Publication Data
US 2018/0163798 A1 Jun. 14, 2018

(30) Foreign Application Priority Data

Dec. 14, 2016 (CN) .................... 2016 2 1367302 U

(51) Int. Cl.
| | | |
|---|---|---|
| F04B 9/08 | (2006.01) | |
| F16D 63/00 | (2006.01) | |
| F16D 65/28 | (2006.01) | |
| E21B 43/12 | (2006.01) | |
| F04B 47/02 | (2006.01) | |
| F04B 49/02 | (2006.01) | |
| F04B 49/10 | (2006.01) | |
| F04B 47/00 | (2006.01) | |
| F16D 121/14 | (2012.01) | |
| F16D 125/64 | (2012.01) | |

(52) U.S. Cl.
CPC .......... *F16D 63/006* (2013.01); *E21B 43/126* (2013.01); *F04B 47/00* (2013.01); *F04B 47/02* (2013.01); *F04B 49/02* (2013.01); *F04B 49/10* (2013.01); *F16D 63/00* (2013.01); *F16D 65/28* (2013.01); *F16D 2121/14* (2013.01); *F16D 2125/64* (2013.01)

(58) Field of Classification Search
CPC ........ F16D 59/00; F16D 63/006; F16D 65/28; B62L 1/04; B62L 5/00; B60T 1/00; B60T 1/005; B60T 1/06
USPC .......................... 188/29, 31, 67, 68; 417/390
See application file for complete search history.

(56) References Cited

U.S. PATENT DOCUMENTS

| | | | | |
|---|---|---|---|---|
| 3,336,892 A | * | 8/1967 | Barry .................... | B63B 22/003 242/128 |
| 4,254,848 A | * | 3/1981 | Moss ...................... | B62L 5/003 188/24.11 |
| 4,660,426 A | * | 4/1987 | Mosley .................. | F04B 47/14 74/41 |
| 4,856,629 A | * | 8/1989 | Paselt ...................... | B62L 1/10 188/24.17 |

(Continued)

*Primary Examiner* — Christopher P Schwartz

(57) ABSTRACT

The utility model provides a hand brake system used on a non-beam pumping unit, including a drive mechanism mounted at the lower part of the pumping unit and an actuator mounted on a side of the main drive sprocket of the pumping unit, and the drive mechanism and the actuator are connected by a wire rope. In the utility model, the drive mechanism and actuator of the brake system are separately arranged, thus ensuring promptness of braking and eliminating the potential safety hazard of workers falling from a height. The braking mode of the existing brake system on a pumping unit is to achieve the braking function by locking the rotary shaft from the outer side. The braking force upon braking is relatively small and the braking reliability is relatively poor.

3 Claims, 5 Drawing Sheets

(56) References Cited

U.S. PATENT DOCUMENTS

| | | | | |
|---|---|---|---|---|
| 6,041,676 A | * | 3/2000 | Bettenhausen | B65B 11/045 254/264 |
| 2003/0111902 A1 | * | 6/2003 | Thiede | B60K 31/0008 303/193 |
| 2006/0024177 A1 | * | 2/2006 | Robison | F04B 47/04 417/390 |

* cited by examiner

HAND BRAKE SYSTEM USED ON PUMPING UNIT WITHOUT WALKING BEAM

BACKGROUND OF THE INVENTION

1. Field of the Invention

The utility model belongs to the field of the non-beam pumping unit, particularly relating to a hand brake system used on the non-beam pumping unit.

2. Description of the Related Art

In the petroleum exploitation, the pumping unit is one of the most commonly used oil extraction equipment and most of the pumping units used in the prior art are beam pumping units. There are problems like low mechanical transmission efficiency, high power consumption, difficulty in maintenance and high fault rate in beam pumping units due to their physical structures. To solve these problems, researchers have developed a non-beam pumping unit. The drive mechanism of existing non-beam pumping units is arranged at a high position, so the brake system is also arranged at a high position. Workers have to climb to the top of pumping units to operate for braking. Therefore, the brake system cannot ensure promptness of braking and faces the potential safety hazard of workers falling from a height.

SUMMARY OF THE INVENTION

The utility model provides a hand brake system used on a non-beam pumping unit to solve the problems present above.

The utility model solves the technical problems by adopting the following technical solutions: the utility model provides a hand brake system used on a non-beam pumping unit, including a drive mechanism, an actuator and a main drive sprocket. The drive mechanism is mounted at the lower part of the pumping unit, the actuator is mounted on a side of the main drive sprocket of the pumping unit, and the drive mechanism and the actuator are connected by a wire rope.

The drive mechanism includes a support A, a support B, a handle, a semicircular plate, a connecting rod and a lower rotary arm. The support A and the support B are both fixedly mounted on the pumping unit, the semicircular plate is fixedly mounted on the support A, the lower rotary arm has a structure of right triangle and the right angle of which is hinged to the support B. An arc track is arranged on the semicircular plate, the lower end of the handle is hinged to the center of the semicircular plate, a slider is arranged on the handle at the place corresponding to the arc track, and the slider is mounted in the arc track and fixed on the handle at the same time. One end of the connecting rod is hinged to the handle and the other end is hinged to one acute angle end on the lower rotary arm, and the other acute angle end on the lower rotary arm is connected with the lower end of the wire rope;

The actuator includes a support C, an upper rotary arm, a spring seat, a drive spindle and a sliding sleeve. The support C is fixedly mounted on the top of the pumping unit, the upper rotary arm also has a structure of right triangle and the right angle of which is hinged to the support C, one acute angle of which is connected with the upper end of the wire rope and the other acute angle of which is hinged to an end of the drive spindle. The spring seat is slidably mounted on the top of the support C and can be fixed by fastening a bolt, the sliding sleeve is fixedly mounted on the top of the support C, the drive spindle is inserted between the spring seat and the sliding sleeve and a spring is sleeved around the drive spindle between the spring seat and the sliding sleeve. A spring shutter is fixedly arranged on the drive spindle, the spring is restricted between the spring shutter and the spring seat, and the end part of the drive spindle is inserted between two adjacent teeth of the main drive sprocket upon braking.

The limit post which locates at the lower side of the point where the support B and the lower rotary arm are hinged together is arranged on the support B. The arc surface which matches with the drive spindle is machined between two adjacent teeth of the main drive sprocket.

The utility model has the following beneficial effects:
1. In the utility model, the drive mechanism and the actuator of the brake system are separately arranged. Pulling the handle at the ground is capable of controlling the actuator at a high position to achieve the purpose of braking. There is no need to climb high to conduct braking operation, thus ensuring promptness of braking and eliminating the potential safety hazard of workers falling from a height.
2. There are obvious differences between new braking mode and the prior art. The braking mode for the existing brake system on a pumping unit is to achieve the braking function by locking the rotary shaft from the outer side. The braking force upon braking is relatively small and the braking reliability is relatively poor. While the utility model achieves braking by inserting a drive spindle between two teeth of the main drive sprocket. Compared with the prior art, the braking reliability is significantly improved.
3. The arrangement of a limit post limits the rotatory range of the lower rotatory arm. When the lower rotatory arm rotates to the limit position, this indicates that the drive spindle has completely moved out of two teeth of the main drive sprocket, thus facilitating the operator to accurately master matching condition of the main drive sprocket and the drive spindle.

Figure 1:
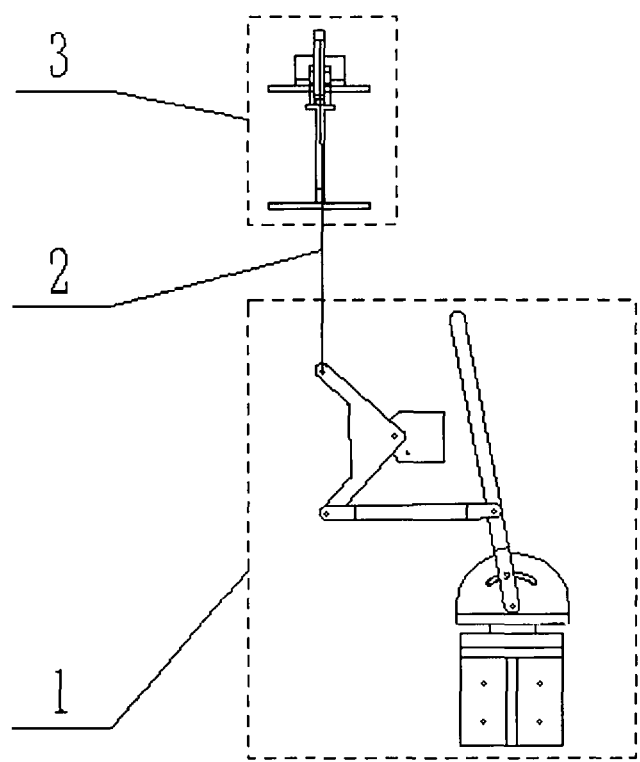
FIG. 1 is a structural schematic diagram of the utility model.
Figure 2:
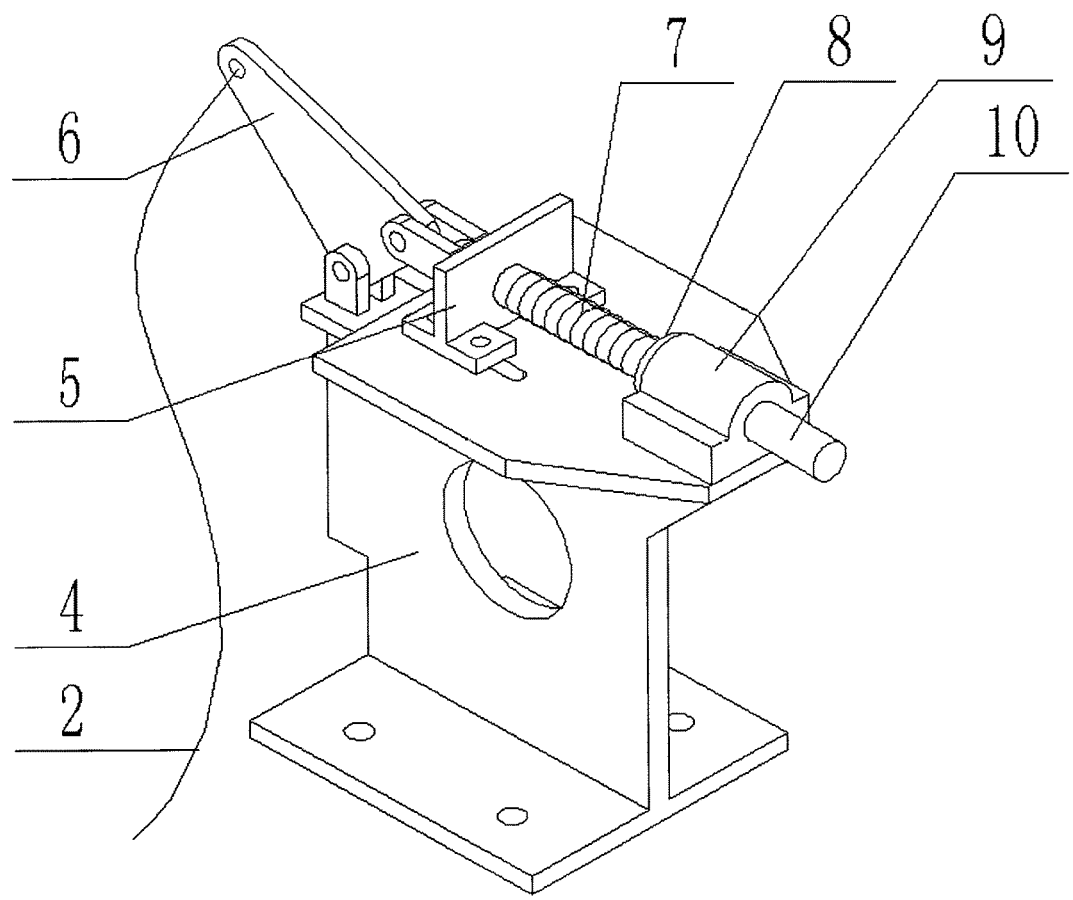
FIG. 2 is a structural schematic diagram of the actuator.
Figure 3:
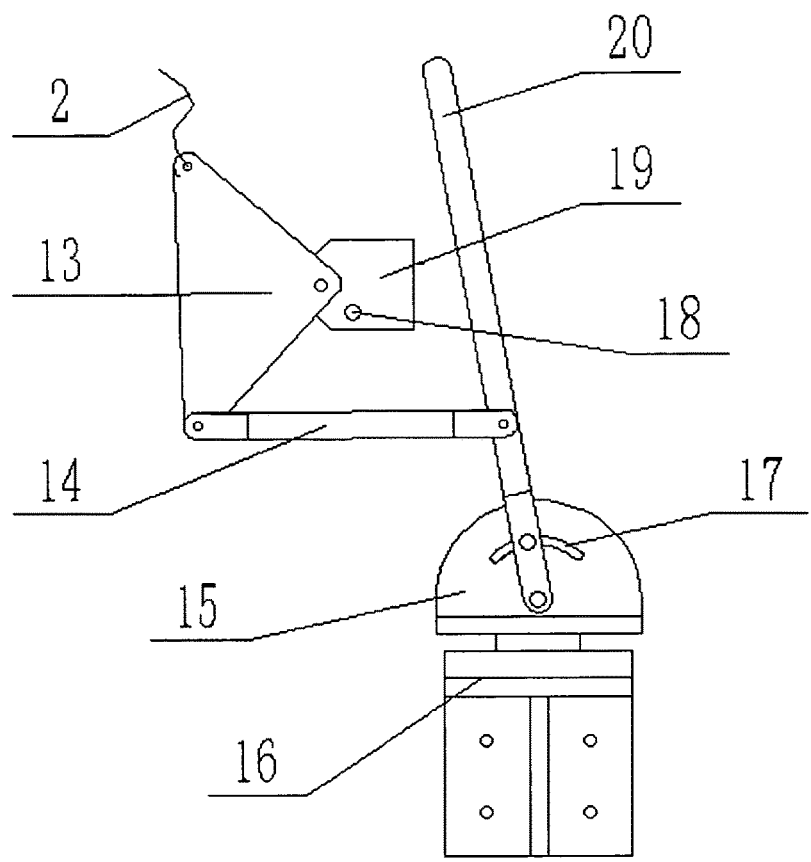
FIG. 3 is a structural schematic diagram of the drive mechanism.
Figure 4:
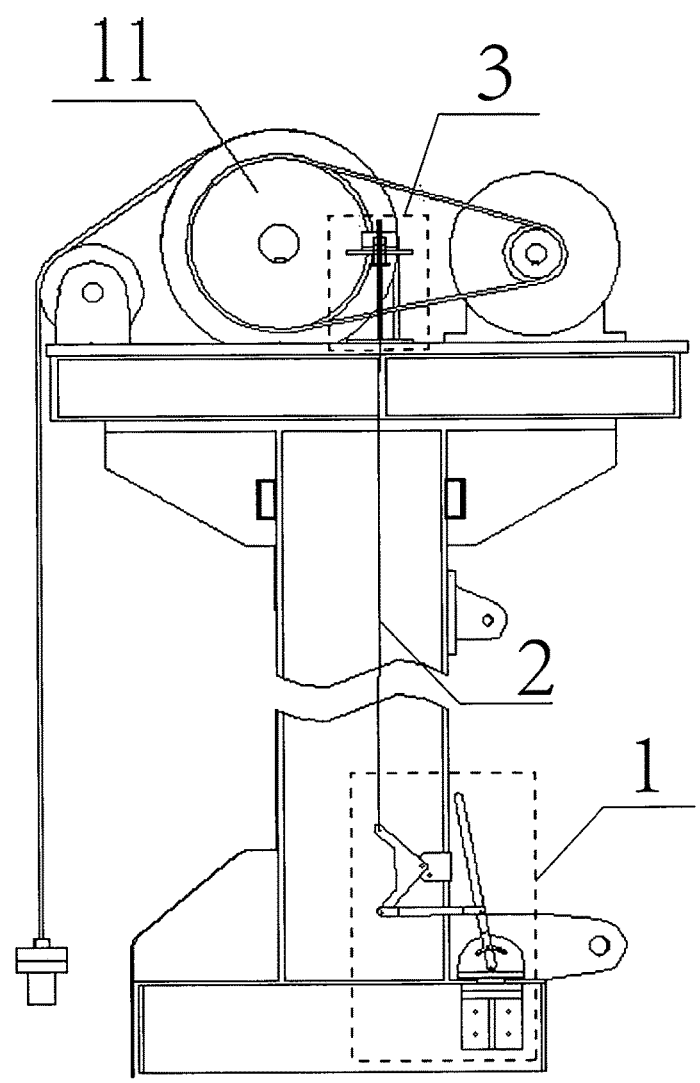
FIG. 4 is a schematic diagram of structure for installation of the utility model.
Figure 5:
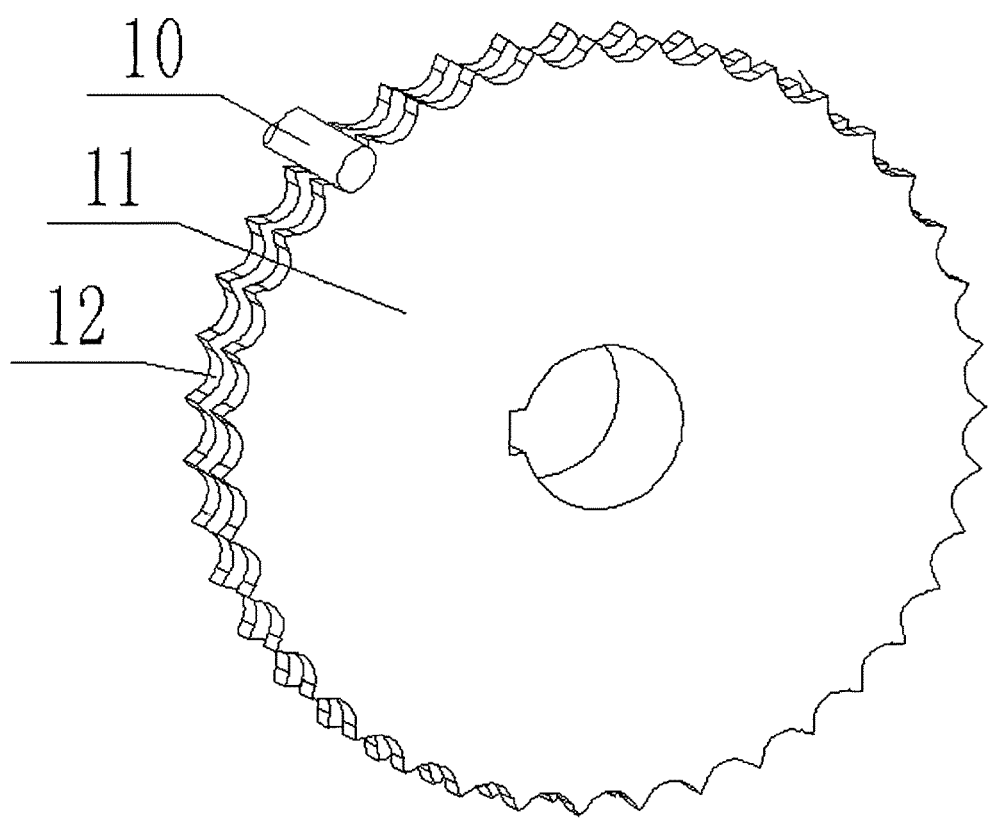
FIG. 5 is a schematic diagram of matching structure between the drive spindle and the main drive sprocket.

In figures: 1-drive mechanism, 2-wire rope, 3-actuator, 4-support C, 5-spring seat, 6-upper rotary arm, 7-spring, 8-spring shutter, 9-sliding sleeve, 10-drive spindle, 11-main drive sprocket, 12-arc surface, 13-lower rotary arm, 14-connecting rod, 15-semicircular plate, 16-support A, 17-arc track, 18-limit post, 19-support B, 20-handle.

DETAILED DESCRIPTION OF THE PREFERRED EMBODIMENT

The utility model is further described as follows with reference to the drawings:

The embodiment includes a drive mechanism 1 and an actuator 3. The drive mechanism 1 is mounted at the lower part of the pumping unit, and the actuator 3 is mounted on a side of the main drive sprocket of the pumping unit. The drive mechanism and the actuator are connected by a wire rope 2. In the utility model, the drive mechanism 1 and actuator 3 of the brake system are separately arranged.

Pulling the handle 20 at the ground is capable of controlling the actuator 3 at a high position to achieve the purpose of braking. There is no need to climb high to conduct braking operation, thus ensuring promptness of braking and eliminating the potential safety hazard of workers falling from a height.

The drive mechanism 1 includes a support A 16, a support B 19, a handle 20, a semicircular plate 15, a connecting rod 14 and a lower rotary arm 13. Both support A 16 and support B 19 are fixedly mounted on the pumping unit, the semicircular plate 15 is fixedly mounted on the support A 16, the lower rotary arm 13 has a structure of right triangle and the right angle of which is hinged to the support B 19.

An arc track 17 is arranged on the semicircular plate 15, the lower end of the handle 20 is hinged to the center of the semicircular plate 15, a slider is arranged on the handle 20 at the place corresponding to the arc track 17, and the slider is mounted in the arc track 17 and fixed on the handle 20 at the same time. The arrangement of the slider makes movement of the handle more stable and can effectively improve resistance to torsion and bending of the handle 20.

One end of the connecting rod 14 is hinged to the handle 20 and the other end is hinged to one acute angle end on the lower rotary arm 13, and the other acute angle end on the lower rotary arm 13 is connected with the lower end of the wire rope 2.

The actuator 3 includes a support C 4, an upper rotary arm 6, a spring seat 5, a drive spindle 10 and a sliding sleeve 9. The support C 4 is fixedly mounted on the top of the pumping unit, the upper rotary arm 6 also has a structure of right triangle and the right angle of which is hinged to the support C 4, one acute angle of which is connected with the upper end of the wire rope 2 and the other acute angle of which is hinged to an end of the drive spindle 10. The spring seat 5 is slidably mounted on the top of the support C 4, the sliding sleeve 9 is fixedly mounted on the top of the support C 4, the drive spindle 10 is inserted between the spring seat 5 and the sliding sleeve 9.

A spring 7 is sleeved around the drive spindle 10 between the spring seat 5 and the sliding sleeve 9. A spring shutter 8 is fixedly arranged on the drive spindle 10, and the spring 7 is restricted between the spring shutter 8 and the spring seat 5. The arrangement of the spring 7 can make the drive spindle 10 automatically insert into designated position after force of handle 20 is released, thus achieving braking.

The end part of the drive spindle 10 is inserted between two adjacent teeth of the main drive sprocket 11 upon braking. There are obvious differences between the braking mode and the prior art. The braking mode for the existing brake system on a pumping unit is to achieve the braking function by locking the rotary shaft from the outer side. The braking force upon braking is relatively small and the braking reliability is relatively poor. While the utility model achieves braking by inserting a drive spindle 10 between two teeth of the main drive sprocket 11. Compared with the prior art, the braking reliability is significantly improved.

An arc surface 12 that matches with the drive spindle 10 is machined between two adjacent teeth of the main drive sprocket 11. The arc surface 12 makes the drive spindle 10 further match with the main drive sprocket 11 and makes the force application point between the drive spindle 10 and the main drive sprocket 11 closer to the root of the teeth, thus enhancing the load bearing capacity of teeth of the main drive sprocket 11.

A limit post 18 that locates at the lower side of the point where the support B 19 and the lower rotary arm 13 are hinged together is arranged on the support B 19. The arrangement of limit post 18 limits the rotatory range of the lower rotatory arm 13. When the lower rotatory arm 13 rotates to the limit position, this indicates that the drive spindle 10 has completely moved out of two teeth of the main drive sprocket 11, thus facilitating the operator to accurately master matching condition of the main drive sprocket 11 and the drive spindle 10 to visually judge braking conditions.

What is claimed is:
1. A hand brake system used on a pumping unit without walking beam, including a drive mechanism (1), an actuator (3) and a main drive sprocket (11), wherein the drive mechanism (1) is mounted at the lower part of the pumping unit, the actuator (3) is mounted on a side of the main drive sprocket (11) of the pumping unit, and the drive mechanism (1) and the actuator (3) are connected by a wire rope (2);
the drive mechanism (1) includes a support A (16), a support B (19), a handle (20), a semicircular plate (15), a connecting rod (14) and a lower rotary arm (13), the support A (16) and the support B (19) are both fixedly mounted on the pumping unit, the semicircular plate (15) is fixedly mounted on the support A (16), the lower rotary arm (13) has a structure of right triangle and the right angle of which is hinged to the support B (19); an arc track (17) is arranged on the semicircular plate (15), the lower end of the handle (20) is hinged to the center of the semicircular plate (15), one end of the connecting rod (14) is hinged to the handle (20) and the other end is hinged to one acute angle end on the lower rotary arm (13), and the other acute angle end on the lower rotary arm (13) is connected with the lower end of the wire rope (2);
the actuator (3) includes a support C (4), an upper rotary arm (6), a spring seat (5), a drive spindle (10) and a sliding sleeve (9); the support C (4) is fixedly mounted on the top of the pumping unit, the upper rotary arm (6) also has a structure of right triangle and the right angle of which is hinged to the support C (4); one acute angle of the right triangle is connected with the upper end of the wire rope (2) and the other acute angle of which is hinged to an end of the drive spindle (10); the spring seat (5) is slidably mounted on the top of the support C (4) and can be fixed by fastening a bolt; the sliding sleeve (9) is fixedly mounted on the top of the support C (4), the drive spindle (10) is inserted between the spring seat (5) and the sliding sleeve (9) and a spring (7) is sleeved around the drive spindle (10) between the spring seat (5) and the sliding sleeve (9); a spring shutter (8) is fixedly arranged on the drive spindle (10), the spring (7) is restricted between the spring shutter (8) and the spring seat (5), and the end part of the drive spindle (10) is inserted between two adjacent teeth of the main drive sprocket (11) upon braking.

2. The hand brake system used on a pumping unit without walking beam according to claim 1, wherein a limit post (18) that locates at the lower side of the point where the support B (19) and the lower rotary arm (13) are hinged together is arranged on the support B (19).

3. The hand brake system used on a pumping unit without walking beam according to claim 1, wherein an arc surface (12) that matches with the drive spindle (10) between two adjacent teeth of the main drive sprocket (11).

* * * * *